US012328799B2

(12) United States Patent
Yender et al.

(10) Patent No.: US 12,328,799 B2
(45) Date of Patent: Jun. 10, 2025

(54) SYSTEM AND METHOD FOR CALIBRATING A CONTROL SYSTEM OPERATING AN ELECTRIC HEATER

(71) Applicant: WATLOW ELECTRIC MANUFACTURING COMPANY, St. Louis, MO (US)

(72) Inventors: Matthew Yender, Winona, MN (US); Brian Geer, St. Louis, MO (US); Eric Meech, Winona, MN (US); Stanton H. Breitlow, Winona, MN (US); Adam Kidney, Winona, MN (US)

(73) Assignee: WATLOW ELECTRIC MANUFACTURING COMPANY, St. Louis, MO (US)

(*) Notice: Subject to any disclaimer, the term of this patent is extended or adjusted under 35 U.S.C. 154(b) by 0 days.

(21) Appl. No.: 18/639,026

(22) Filed: Apr. 18, 2024

(65) Prior Publication Data

US 2024/0267998 A1 Aug. 8, 2024

Related U.S. Application Data

(62) Division of application No. 16/894,236, filed on Jun. 5, 2020, now Pat. No. 12,004,267.

(Continued)

(51) Int. Cl.
*H05B 1/02* (2006.01)
*H05B 3/26* (2006.01)

(52) U.S. Cl.
CPC ............... *H05B 1/023* (2013.01); *H05B 3/26* (2013.01)

(58) Field of Classification Search
CPC .... H05B 1/02; H05B 1/023; H05B 2203/002; H05B 2203/011; H05B 2203/013;
(Continued)

(56) References Cited

U.S. PATENT DOCUMENTS

2010/0288011 A1 11/2010 Groft et al.
2012/0292308 A1* 11/2012 Fennewald ............ H05B 1/023 219/552

(Continued)

FOREIGN PATENT DOCUMENTS

CN 101077035 A 11/2007
EP 3981222 B1 3/2024

(Continued)

OTHER PUBLICATIONS

Search Report issued in corresponding MY Application No. PI2021007164, issued Oct. 1, 2024, 4 pages.

(Continued)

*Primary Examiner* — Vy T Nguyen
(74) *Attorney, Agent, or Firm* — Burris Law, PLLC

(57) ABSTRACT

A method for calibrating a control system configured to control a two-wire heater includes providing power to a load electrically coupled to the control system, generating, an initial measured characteristic and a calibrated measured characteristic of the load by the control system and a controller calibration system, respectively. The method further includes defining a calibrated measurement reference based on a correlation of the initial measured characteristic and the calibrated measured characteristic. With the calibrated measure reference, the control system is further calibrated to define a resistance-temperature calibration reference for determining a working temperature of the two-wire heater based on a measured resistance of the two-wire heater.

20 Claims, 8 Drawing Sheets

Related U.S. Application Data

(60) Provisional application No. 62/858,587, filed on Jun. 7, 2019.

(58) Field of Classification Search
CPC ........ H05B 2203/017; H05B 2203/035; H05B 3/0019; H05B 3/22; H05B 3/26; H05B 3/28; H05B 3/42; H05B 3/46; G01R 19/16519; G01R 19/225; G01R 19/257; G01R 35/00
USPC .......................... 219/490, 502, 543; 392/307
See application file for complete search history.

(56) References Cited

U.S. PATENT DOCUMENTS

| | | | | |
|---|---|---|---|---|
| 2014/0216459 | A1* | 8/2014 | Vos | A61M 16/16 128/204.17 |
| 2017/0254564 | A1 | 9/2017 | Everly et al. | |
| 2020/0187304 | A1* | 6/2020 | Yamada | G05D 23/1919 |

FOREIGN PATENT DOCUMENTS

| | | | |
|---|---|---|---|
| JP | 2005149878 | A | 6/2005 |
| JP | 2017201690 | A | 11/2017 |
| JP | 2018505696 | A | 3/2018 |
| JP | 2019061960 | A | 4/2019 |
| JP | 2019511090 | A | 4/2019 |
| JP | 2020512547 | A | 4/2020 |
| WO | 2012165174 | A1 | 12/2012 |

OTHER PUBLICATIONS

Office Action issued in corresponding JP Application No. 2021-572294, issued Apr. 2, 2024, and an English Translation, 5 pages.

Decision for Patent issued in corresponding JP Application No. 2024-095720, issued Apr. 16, 2025, and an English Translation, 4 pages.

* cited by examiner

SYSTEM AND METHOD FOR CALIBRATING A CONTROL SYSTEM OPERATING AN ELECTRIC HEATER

CROSS-REFERENCE TO RELATED APPLICATIONS

This application is a divisional of U.S. patent application Ser. No. 16/894,236 filed Jun. 5, 2020, which claims priority to and the benefit of U.S. Provisional application 62/858,587 filed on Jun. 7, 2019. The disclosures of the above applications are incorporated herein by reference.

FIELD

The present disclosure relates to calibrating a control system that controls an electric heater.

BACKGROUND

The statements in this section merely provide background information related to the present disclosure and may not constitute prior art.

Heaters for semiconductor processing typically include a heating plate that has a substrate and resistive heating elements provided in the substrate to define one or more heating zones. In some applications, the resistive heating elements function as heaters and as temperature sensors with only two lead wires operatively connected to the resistive heating element rather than four (e.g., two for the heating element and two for a discrete temperature sensor). In one form, such resistive heating elements may be defined by a relatively high temperature coefficient of resistance (TCR) material, and the temperature of the resistive heating elements can be determined based on the resistance of the heating element.

In one application, the heater is controlled by a control system that measures the temperature of the resistive heating elements based on the resistance of the heating elements. To control the heater, the control system calculates resistance based on voltage and/or current measurements and determines the temperature of each zone based on the resistance calculated. While standardized information such as tables that associate resistance values to temperature for a given resistive heater material may be used, heaters may operate differently from each other even if the heaters are of the same type. This can be caused by, for example, manufacturing variations, material batch variations, age of the heater, number of cycles, and/or other factors, which causes inaccuracies in the calculated temperatures. These and other issues related to the use of two-wire resistive heaters are addressed by the present disclosure.

SUMMARY

This section provides a general summary of the disclosure and is not a comprehensive disclosure of its full scope or all of its features.

In one form, the present disclosure is directed toward a method for calibrating a control system configured to control a two-wire heater that is operable to generate heat and to function as a sensor for measuring electrical characteristics of the two-wire heater. The method includes providing, by the control system, power to a load electrically coupled to the control system, generating, by the control system, an initial measured characteristic of the load and generating, by a controller calibration system coupled to the load, a calibrated measured characteristic of the load. The initial measured characteristic and the calibrated measured characteristic are indicative of an electrical characteristic of the load. The electrical characteristic of the load includes a voltage, a current, a resistance, or a combination thereof. The method further includes correlating the initial measured characteristic with the calibrated measured characteristic, and defining a calibrated measurement reference based on the correlation of the initial measured characteristic and the calibrated measured characteristic. The control system employs the calibrated measurement references to provide precise measurements for controlling the two-wire heater In another form, generating, by the control system, the initial measured characteristic further includes measuring, by the control system, an initial voltage and an initial current of the load. The initial measured characteristic includes the initial voltage and the initial current. Generating, by the controller calibration system coupled to the load, the calibrated measured characteristic further includes measuring, by the controller calibration system, a calibrated voltage and a calibrated current of the load. The calibrated measured characteristic includes the calibrated voltage and the calibrated current. The initial voltage and the calibrated voltage are concurrently measured, and the initial current and the calibrated current are concurrently measured.

In yet another form, the method further includes calculating an initial resistance of the load based on the initial voltage and the initial current of the load, and calculating a calibrated resistance of the load based on the calibrated voltage and the calibrated current of the load. The initial measured characteristic further includes the initial resistance and the calibrated measured characteristic further includes the calibrated resistance.

In one form, power is provided to the load at a plurality of power setpoints. For each of the plurality of power setpoints, the initial measured characteristic is generated by the control system and the calibrated measured characteristic is generated by the controller calibration system to provide a plurality of initial measured characteristics and a plurality of calibrated measured characteristics. The plurality of initial measured characteristics is correlated with the plurality of calibrated measured characteristics, and the calibrated measurement reference is defined based on the correlation of the plurality of initial measured characteristics and the plurality of calibrated measure characteristics.

In another form, the load is a controllable load having an adjustable resistance, and the method further includes setting a resistance of the load to a plurality of resistance setpoints, and for each of the plurality of resistance setpoints, the initial measured characteristic is generated by the control system and the calibrated measured characteristic is generated by the controller calibration system to provide a plurality of initial measured characteristics and a plurality of calibrated measured characteristics. The plurality of initial measured characteristics is correlated with the plurality of calibrated measure characteristics, and the calibrated measurement reference is defined based on the correlation of the plurality of initial measured characteristics and the plurality of calibrated measure characteristics.

In yet another form, with the control system electrically coupled to the two-wire heater, the method further includes controlling, by the control system, the two-wire heater to a temperature setpoint from among a plurality of temperature setpoints, concurrently acquiring voltage and current (V-I) characteristics of the two-wire heater from the control system and temperature dataset of the two-wire heater from a temperature sensor system. The V-I characteristics and the temperature dataset are acquired for each of the plurality of temperature setpoints. The method further includes determining, for each of the plurality temperature setpoints, a resistance of the two-wire heater based on the V-I characteristics acquired and the calibrated measurement reference, calculating, for each of the plurality temperature setpoints, a temperature metrology data based on the temperature dataset acquired, correlating the resistances of the two-wire heater and the temperature metrology data for the plurality of temperature setpoints, and defining a resistance-temperature calibration reference for determining a working temperature of the two-wire heater based on a measured resistance of the two-wire heater.

In one form, acquiring the V-I of the two-wire heater from the control system and the temperature dataset of the two-wire heater from the temperature sensor system further includes measuring, by a sensor circuit of the control system, the V-I characteristics of the two-wire heater, and measuring, by the temperature sensor system, a plurality of temperature measurements of the two-wire heater at the temperature setpoint. The plurality of temperature measurements is provided as the temperature dataset for the temperature setpoint.

In another form, the temperature metrology data includes a mean temperature, a median temperature, a temperature variance, a standard deviation, a maximum temperature, a minimum temperature, a temperature range, a 3-sigma value, or a combination thereof.

In yet another form, the load is an active resistance bank having an adjustable resistance.

In one form, the present disclosure is directed toward a method for calibrating a control system configured to operate a two-wire heater. The two-wire heater is operable to generate heat and to function as a sensor for measuring temperature of the two-wire heater. The method includes controlling, by the control system, the two-wire heater to a temperature setpoint from among a plurality of temperature setpoints, concurrently acquiring voltage and current (V-I) characteristics of the two-wire heater from the control system and temperature dataset of the two-wire heater from a temperature sensor system. The V-I characteristics and the temperature dataset are acquired for each of the plurality of temperature setpoints. The method further includes determining, for each of the plurality temperature setpoints, a resistance of the two-wire heater based on the V-I characteristics acquired, calculating, for each of the plurality temperature setpoints, a temperature metrology data based on the temperature dataset acquired, correlating the resistances of the two-wire heater and the temperature metrology data for plurality of temperature setpoints, and defining a resistance-temperature calibration reference for determining a working temperature of the two-wire heater based on a measured resistance of the two-wire heater.

In another form, acquiring the V-I characteristics of the two-wire heater and the temperature dataset further includes measuring, by a sensor circuit of the control system, the V-I characteristics of the two-wire heater, and measuring, by the temperature sensor system, a plurality of temperature measurements of the two-wire heater at the temperature setpoint. The plurality of temperature measurements is provided as the temperature dataset for the temperature setpoint.

In yet another form, the temperature metrology data includes a mean temperature, a median temperature, a temperature variance, a standard deviation, a maximum temperature, a minimum temperature, a temperature range, a 3-sigma value, or a combination thereof.

In one form, the two-wire heater includes a plurality of resistive heating elements that define a plurality of zones, the control system is configured to control each zone independently, the V-I characteristics of the two-wire heater acquired from the control system includes V-I characteristics for each of the plurality of zones. The V-I characteristics for a zone among the plurality of zones is provided as a zone characteristic. The temperature dataset of the two-wire heater acquired from the temperature sensor system includes at least one temperature measurement for each of the plurality of the zones.

In another form, controlling, by the control system, the two-wire heater to the temperature setpoint further includes providing power to the plurality of zones of the two-wire heater, obtaining a temperature for each of the plurality of zones of the two-wire heater, and adjusting power to the plurality of zones in response to the temperature of one or more zones from among the plurality of zones not equaling the temperature setpoint.

In yet another form, the temperature sensor system includes a plurality of temperature sensors, and the method further includes associating, for each zone of the plurality of zones, one or more temperature sensors among the plurality of temperature sensors with a respective zone. The one or more temperature sensors are configured to provide the temperature measurement for the respective zone.

In one form, each of the plurality of zones is associated with two or more temperature sensors from among the plurality of temperature sensor. The two or more temperature sensors are provided as a sensing group, and the method further includes performing, for each sensing group, a sensor diagnostic to identify a faulty temperature sensor from among temperatures sensors of the sensing group based on the temperature measurements from the sensing group, discarding the temperature measurement from the faulty temperature sensor in response to the sensor diagnostic identifying the faulty temperature sensor and when a number of identified faulty temperature sensor is less than a faulty sensor threshold, and shutting off power to the two-wire heater in response to in response to the sensor diagnostic identifying the faulty temperature sensor and when the number of identified faulty temperature sensor is greater than the faulty sensor threshold.

In another form, each of the plurality of zones is associated with two or more temperatures sensors from among the plurality of temperature sensors and two or more temperature sensors are provided as a sensing group. The method further includes calculating, for each sensing group, a zone temperature metrology data based on the temperature measurement from the two or more temperatures sensors of respective sensing group.

In yet another form, the zone temperature metrology data includes a mean temperature, a median temperature, a temperature variance, a standard deviation, a maximum temperature, a minimum temperature, a temperature range, a 3-sigma value, or a combination thereof.

In one form, the present disclosure is directed toward a method for calibrating a control system configured to operate a two-wire heater. The two-wire heater being operable to generate heat and as a sensor for measuring temperature of the two-wire heater. The method includes controlling, by the control system, the two-wire heater to a temperature setpoint from among a plurality of temperature setpoints and concurrently acquiring voltage and current (V-I) characteristics of the two-wire heater from the control system and temperature dataset of the two-wire heater from a temperature sensor system. The V-I characteristics and the temperature dataset are acquired for each of the plurality of temperature setpoints. The temperature sensor system includes a plurality of temperature sensors. The method further includes performing a sensor diagnostic to identify a faulty temperature sensor from among the plurality of temperatures sensors based on the temperature measurements, discarding the temperature measurement from the faulty temperature sensor in response to the sensor diagnostic identifying the faulty temperature sensor and when a number of identified faulty temperature sensor is less than a faulty sensor threshold, and shutting off power to the two-wire heater in response to in response to the sensor diagnostic identifying the faulty temperature sensor and when the number of identified faulty temperature sensor is greater than the faulty sensor threshold.

In another form, in response to the sensor diagnostic not identifying the faulty temperature sensor or when the number of identified faulty temperature sensor is less than the faulty sensor threshold, the method further includes determining, for each of the plurality temperature setpoints, a resistance of the two-wire heater based on the V-I characteristics acquired, and calculating, for each of the plurality temperature setpoints, a temperature metrology data based on the temperature dataset, correlating the resistances of the two-wire heater and the temperature metrology data for plurality of temperature setpoints, and defining a resistance-temperature calibration reference for determining a working temperature of the two-wire heater based on a measured resistance of the two-wire heater.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
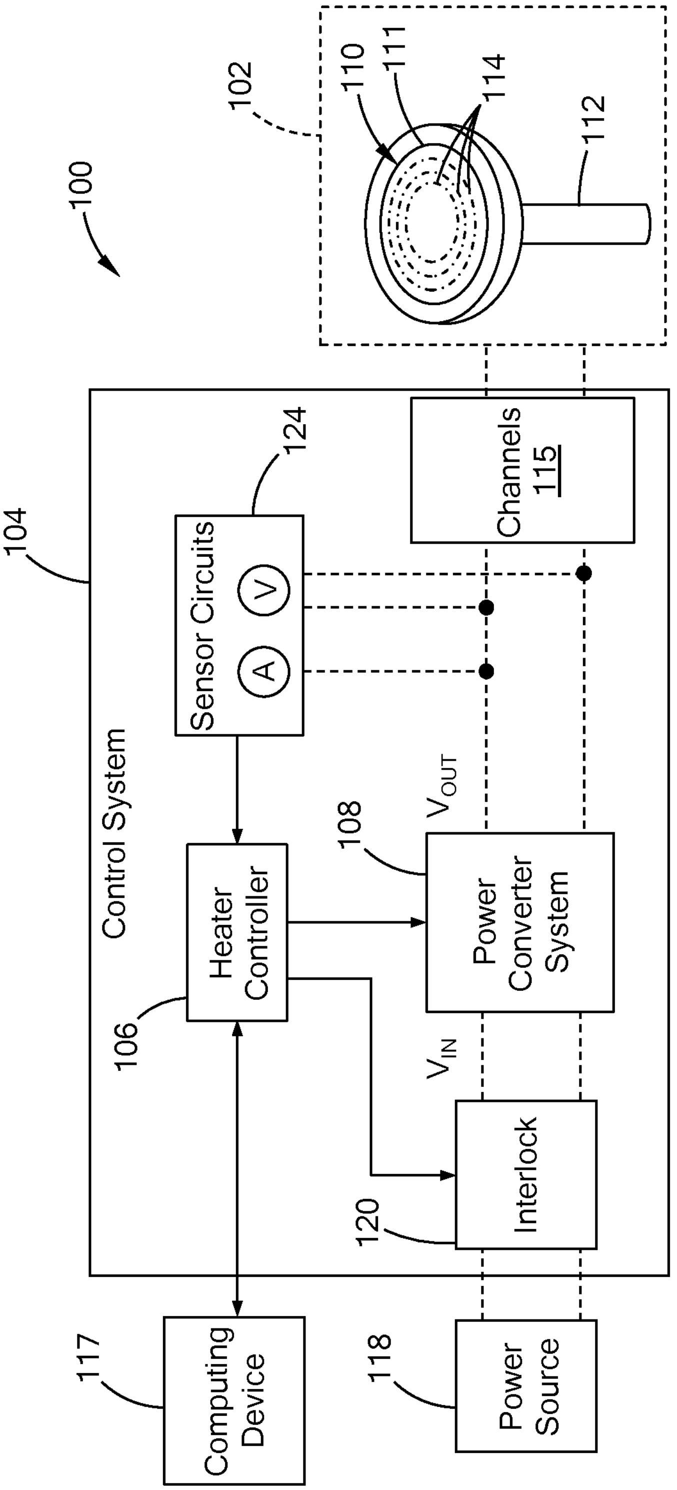
FIG. 1 is block diagram of thermal system having a multi-zone heater and a control system according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A control system for a multi-zone heater having resistive heating elements operable as heaters and temperature sensors incorporates a customizable feedback control to selectively adjust the thermal profile of the heater based on measured electrical characteristics of the heater. To perform the feedback control for a specific multi-zone heater, the control system is calibrated to accurately measure electrical characteristics of the heater (e.g., voltage, current and/or resistance) over a wide voltage range (e.g., 1-240V) and a wide current range (10 mA-30 A).

More particularly, in one form, the control system simultaneously measures voltage and current (e.g., voltage and current measured within ±140 μs), and calculates a resistance based on the measurements. With the power waveform varying with time, the current and voltage measurements are taken closer to each other to obtain an accurate resistance value (e.g., ±0.005 ohms, ±0.010 ohms, or other tolerances). Furthermore, due to the variations between similar heater types, the control system performs a calibration process to obtain a resistance-temperature calibration data that is specific for the heater being controlled by the control system to accurately calculate the temperature of the heater based on the resistance.

The present disclosure is directed toward calibration processes for calibrating the measuring capabilities of the control system and for generating the resistance-temperature calibration data. In the following, these processes are identified as: (I) calibration of control system measurement; and (II) calibration of resistance-temperature for a heater. In the figures, the power lines are illustrated as broken lines, and data signal lines are provided as solid lines.

Figure 2:
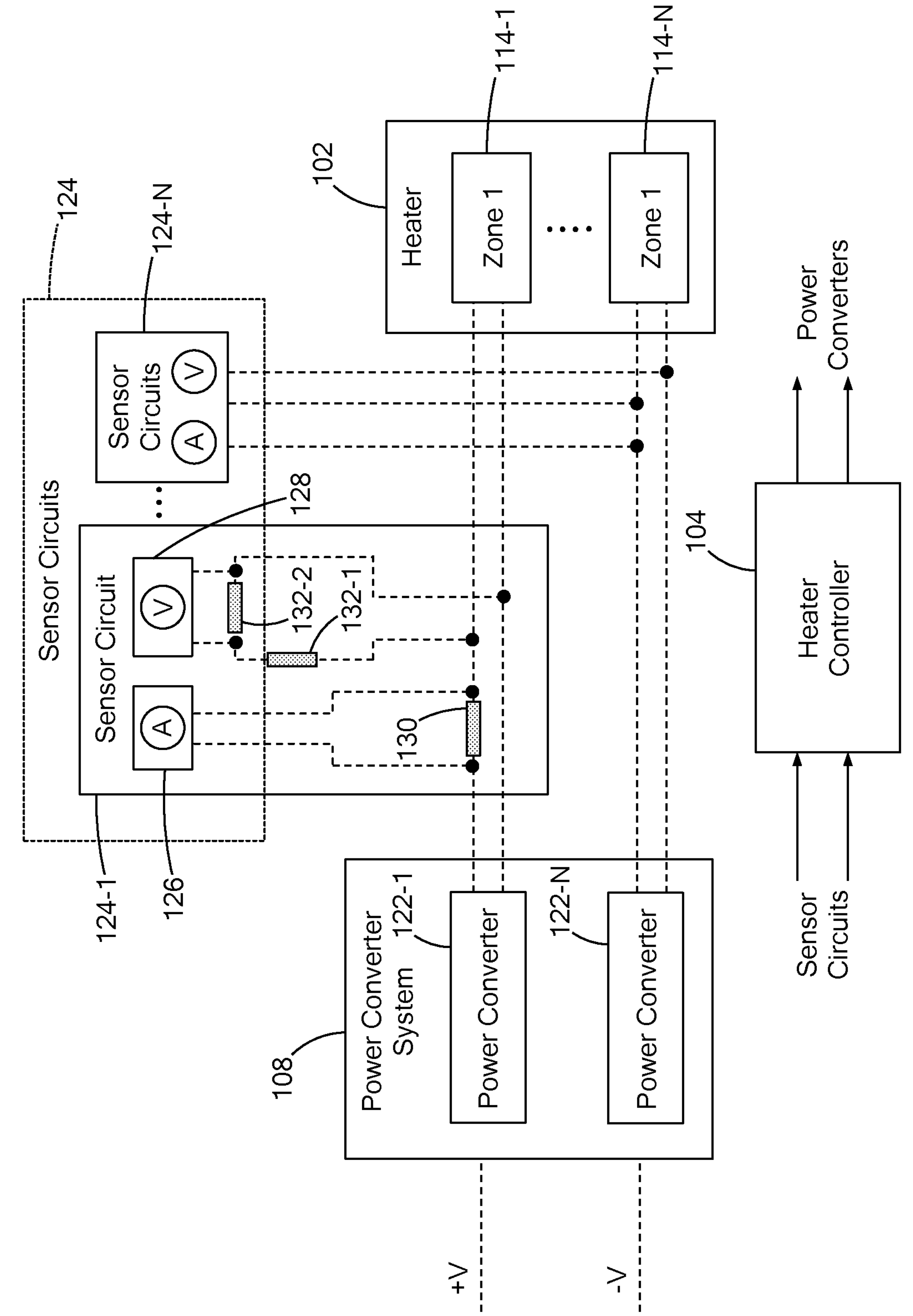
FIG. 2 is a block diagram of the control system of FIG. 1.

To better understand the application of the two calibration processes, an example configuration of a thermal system having a heater, such as multizone heater in one form, and a control system is first provided. Referring to FIGS. 1 and 2, a thermal system 100 includes a multi-zone pedestal heater 102 and a control system 104 having a heater controller 106 and a power converter system 108. In one form, the heater 102 includes a heating plate 110 and a support shaft 112 disposed at a bottom surface of the heating plate 110. The heating plate 110 includes a substrate 111 and a plurality of resistive heating elements (not shown) embedded in or disposed along a surface of the substrate 111. The substrate 111 may be made of ceramics or aluminum. The resistive heating elements are independently controlled by the controller 106 and define a plurality of heating zones 114 as illustrated by the dashed-dotted lines in the figure. These heating zones 114 are merely exemplary and could take on any configuration while remaining within the scope of the present disclosure.

In one form, the heater 102 is a “two-wire” heater in which the resistive heating elements function as heaters and as temperature sensors with only two leads wires operatively connected to the heating element rather than four. Such two-wire capability is disclosed for example in U.S. Pat. No. 7,196,295, which is commonly assigned with the present application and incorporated herein by reference in its entirety. Typically, in a two-wire system, the resistive heating elements are defined by a material that exhibits a varying resistance with varying temperature such that an average temperature of the resistive heating element is determined based on a change in resistance of the heating element. In one form, the resistance of the resistive heating element is calculated by first measuring the voltage across and the current through the heating elements and then, using Ohm's law, the resistance is determined. The resistive heating element may be defined by a relatively high temperature coefficient of resistance (TCR) material, a negative TCR material, or a material having a non-linear TCR.

The control system 104 controls the operation of the heater 102, and more particularly, is configured to independently control power to each of the zones 114. In one form, the control system 104 is electrically coupled to the zones 114 via channels 115, such that each zone 114 is coupled to a channel 115 that has two terminals (not shown) for providing power and sensing temperature.

In one form, the control system 104 is electrically coupled to a computing device 117 (e.g., a computer having one or more human interface devices such as a display, keyboard, mouse, speaker, a touch screen, among others). In one form, the control system 104 is coupled to a power source 118 that supplies an input voltage (e.g., 240V, 208V) to the power converter system 108 by way of an interlock 120. The interlock 120 controls power flowing between the power source 118 and the power converter system 108 and is operable by the heater controller 106 as a safety mechanism to shut-off power from the power source 118. While illustrated in FIG. 1, the control system 104 may not include the interlock 120.

The power converter system 108 is operable to adjust the input voltage to apply a desired power output (e.g., desired output voltage ($V_{OUT}$)) to the heater 102. In one form, the power converter system 108 includes a plurality of power converters 122 (122-1 to 122-N in figures) that are operable to apply an adjustable power output to the resistive heating elements of a given zone 114 (114-1 to 114-N in figures). One example of such a power converter system is described in co-pending application U.S. Ser. No. 15/624,060, filed Jun. 15, 2017 and titled "POWER CONVERTER FOR A THERMAL SYSTEM", which is commonly owned with the present application and the contents of which are incorporated herein by reference in its entirety. In this example, each power converter includes a buck converter that is operable by the heater controller to generate a desired output voltage that is less than or equal to input voltage for one or more heating elements of a given zone 114. Accordingly, the power converter system is operable to provide a customizable amount of power (i.e., a desired power output) to each zone of the heater.

With the use of a two-wire heater, the control system 104 includes sensor circuits 124 (i.e., 124-1 to 124-N in FIG. 2) to measure voltage and/or current of the resistive heating elements, which is then used to determine performance characteristics of the zones, such as resistance, temperature, and other suitable information. In one form, a given sensor circuit 124 is configured to measure a current flowing through and voltage applied to the heating element(s) in a given zone 114, as illustrated by an ammeter 126 and a voltmeter 128 in the figures.

In one form, FIG. 2 illustrates sensor circuits 124-1 to 124-N, where each sensor circuit 124 is coupled to the electric circuit between a given power converter 122 and a given zone 114 to measure the electrical characteristics of the heating element(s) of the given zone. In one form, each ammeter 126 includes a shunt 130 for measuring the current, and each voltmeter 128 includes a voltage divider 132, which is represented by resistors 132-1 and 132-2. Alternatively, the ammeter 126 may measure current using a Hall effect sensor or a current transformer in lieu of the shunt 130.

In one form, the ammeter 126 and the voltmeter 128 are provided as a power metering chip to simultaneously measure current and voltage regardless of the power being applied to the heating element. In another form, the voltage and/or current measurements may be taken at zero-crossing, as described in U.S. Pat. No. 7,196,295.

Based on the current and voltage measurements, the heater controller 106 determines the resistance, and thus, an average temperature of the resistive heating elements that define the zones 114. The heater controller 106 includes one or more microprocessors and memory for storing computer readable instructions executed by the microprocessors. The controller 106 is configured to perform one or more control processes in which the controller 106 determines the desired power to be applied to the zones, such as 100% of input voltage, 90% of input voltage, etc. Example control processes are described in co-pending application U.S. Ser. No. 15/624,060, and co-pending application U.S. Ser. No. 16/100,585, filed Aug. 10, 2018 and titled "SYSTEM AND METHOD FOR CONTROLLING POWER TO A HEATER, which is commonly owned with the present application and the contents of which are incorporated herein by reference in its entirety.

It should be readily understood, that while specific components are illustrated and described, the thermal system may include other components while remaining within the scope of the present disclosure. For example, in one form, the control system 104 may include electronic components that isolate low voltage components from high voltage components and still allow the components to exchange signal.

(I) Calibration of Control System Measurement

Figure 3:
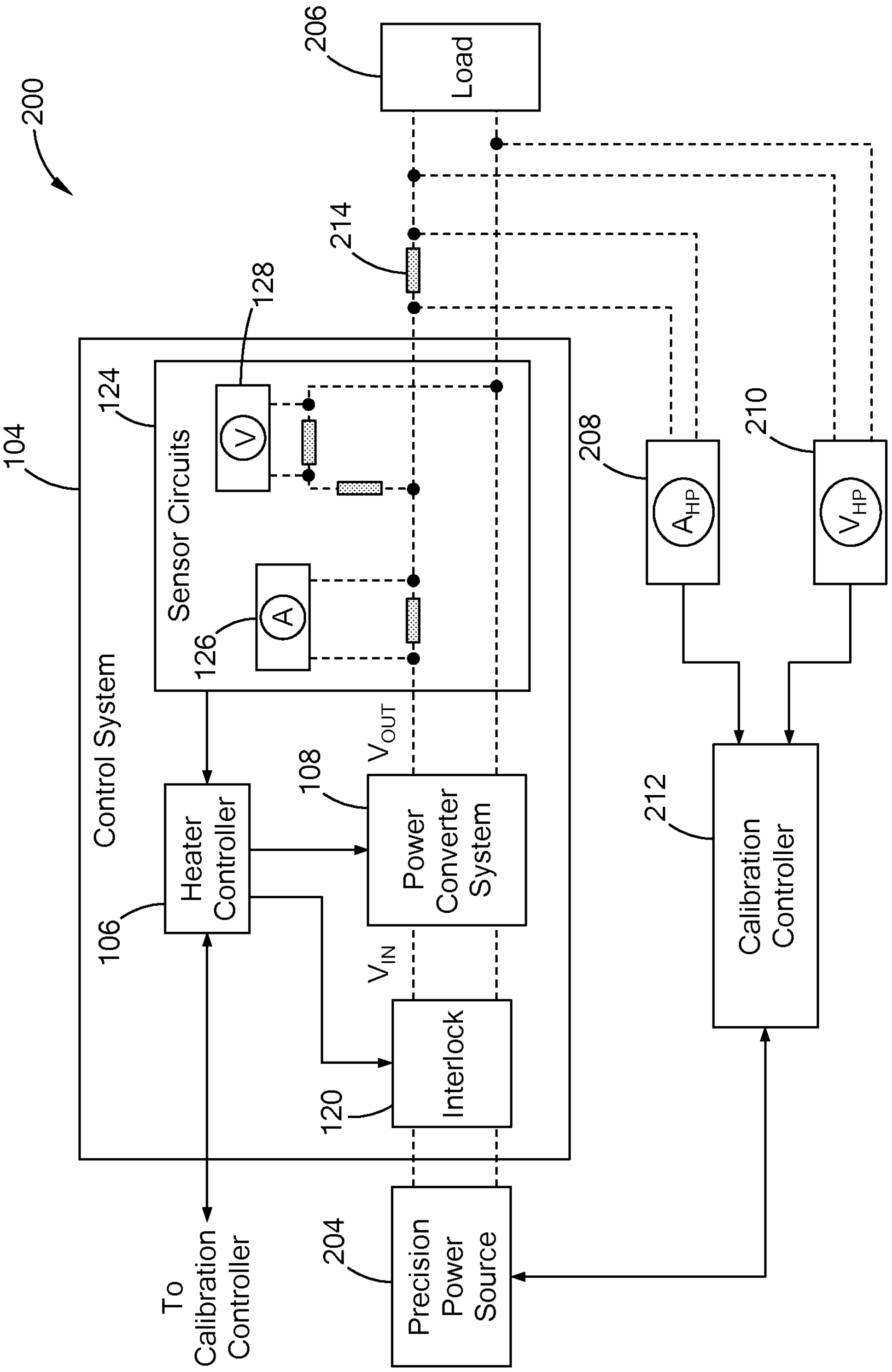
FIG. 3 is a block diagram of a calibration system according to the present disclosure for calibrating the control system of FIG. 1.

Referring to FIG. 3, a controller calibration system 200 is configured to calibrate current and voltage measurements taken by the control system 104. In FIG. 3, the channels 115 are not illustrated and the sensor circuits 124 are broadly represented as having an ammeter 126 and voltmeter 128 for ease of illustrating the calibration process. The controller calibration system 200 includes a precision power source 204, a controllable load 206, a high-precision ammeter 208, a high-precision voltmeter 210, and a calibration controller 212. The precision power source 204 is electrical connected to the control system 104 via a power input interface (not shown) to provide stable and accurate power to the control system 104 during the calibration process to inhibit or reduce power variation (e.g., ±0.01V). In one form, the precision power source 204 is operable to provide a wide range of voltage and wide range of current to the control system 104 and may be one or more DC power sources. For example, the precision power source 204 may include a bank of DC sources, such as a CHROMA 62012 type DC power source. The precision power source 204 may also be one or more AC power sources. It should be readily understood that the precision power source 204 may be other suitable power source and should not be limited to a CHROMA 62012 type DC power source.

The controllable load 206 is electrically coupled to the control system 104 via a cable interface (not shown) to provide a stable current load that displays minimal to no variations during procession measurements. In an example application, the controllable load 206 is an active load bank (e.g., an electronic load bank) to generate a known load with zero to minimum error, such as a CHROMA 63600 type load device. In one form, the controllable load 206 is controllable by the calibration controller 212, such that the calibration controller 212 sets the resistance of the load 206. In another form, the controllable load 206 may be a fixed resistance load and thus, is not controlled by the calibration controller 212. In this form, the calibration controller 212 may not be connected to the controllable load 206. It should be readily understood that the controllable load 206 may be other suitable controllable loads and should not be limited to a CHROMA 63600 type load device.

The high-precision (HP) ammeter 208 and the high precision (HP) voltmeter 210 are configured to measure the current through and the voltage applied to controllable load 206, respectively. In one form, the HP ammeter 208 measures the current through a shunt 214 based on a voltage across the shunt 214 and a known resistance of the shunt 214, but other types of ammeters 208 may also be used while remaining within scope of the present disclosure. In one form, the HP ammeter 208 and the HP voltmeter 210 are provided as a multi-meter with a 7.5 digit meter. For example, the HP ammeter 208 and the HP voltmeter 210 may be a PXI-7 ½ digit type multimeter. In one form, the current measurement taken by the HP ammeter 208 is taken concurrently with the current measurement taken by the ammeter 126 of the sensor circuit 124 and the voltage measurement taken by the HP voltmeter 210 is taken concurrently with the voltage measurement taken by the voltmeter 128 of the sensor circuit 124 to calibrate the current and voltage measurements of the control system with that of the HP ammeter 208 and the HP voltmeter 210. The HP ammeter 208 and the HP voltmeter 210 may collectively be referred to as precision voltage-current (V-I) sensors 208 and 210 herein.

In one form, the calibration controller 212 is a computer that has one or more microprocessors and memory for storing computer readable instructions executed by the microprocessors. The calibration controller 212 is communicably coupled to one or more human interfaces (not shown), such as a monitor, mouse, keyboard, speaker, to communicate with a user performing the calibration.

The calibration controller 212 is communicably coupled to the precision power source 204 to set the input voltage applied to the control system 104 and to the precision V-I sensors 208 and 210 to obtain current and voltage measurements (i.e., precision current-voltage data or calibrated measured characteristic). In one form, the calibration controller 212 is communicably coupled to the control system 104 to exchange data such as the measurements taken by the sensor circuit(s) 124, with the control system 104. In one form, the calibration controller 212 obtains the voltage measurements and the current measurements from the precision V-I sensors 208 and 210 and the sensor circuit(s) 124 at approximately the same measurement time (i.e., concurrently). In another form, the calibration controller 212 concurrently obtains the voltage measurements from the HP voltmeter 210 and the sensor circuit(s) 124 and concurrently obtains the current measurements from the HP ammeter 208 and the sensor circuit(s) 124, which may be at a different time from that of the voltage measurements.

In one form, with the four measurements being obtained concurrently, the calibration controller 212 is configured to determine control system resistances based on the measurements from the sensor circuits 124 and calibrated resistances based on the measurements from the precision V-I sensors 208 and 210. In one form, the control system 104 calculates resistance based on a root-mean square (RMS) of the current and voltage measurements, and thus, may include a true RMS converter that simultaneously measures an RMS current and an RMS voltage using high sample rate (e.g., 140 μs or 7 kHz to allow accurate observation of the power waveform). In another form, the control system 104 is configured to simultaneously measure the peak current and the peak voltage using the precision V-I sensors 208 and 210, which can be sampled at, for example, every 10 ms for 50 Hz and 8.3 ms for 60 Hz, respectively. The voltage over current ratio provides the resistance reading over a voltage range and odd waveforms. This method results in measurements that are substantially consistent with pure DC signals and AC signals of various shapes and hybrid AC/DC systems.

Because the control system 104 measures resistance for multiple zones 114 using multiple sensor circuits 124, voltage and current measurements from each sensor circuit 124 are calibrated. Measurements from the sensors circuits 124 can be obtained all at once, one-by-one, or even in groups. For example, in one configuration, each channel 115 is connected to a controllable load 206 and one set of precision V-I sensors 208 and 210 is configured to measure the current and voltage at each load 206. The control system 104 may then apply power to each load 206 via the power converter system 108 and obtain measurements from each sensor circuit 124. In addition, the calibration controller 212 acquires measurements from each set of precision V-I sensors 208 and 210. Accordingly, measurements from all of the sensor circuits 124 can be obtained at once. In another configuration, measurements from the sensor circuits 124 are obtained one at a time or in groups based on the number of controllable loads 206 and precision V-I sensors 208 and 210 available. For example, with one controllable load 206 and one set of precision V-I sensors 208 and 210, the controllable load 206 is connected to a selected channel 115 and the control system 104 is operable to transmit power to the selected channel 115 and obtain measurements from the sensor circuit 124 associated with the selected channel 115.

To distinguish between the electrical characteristic(s) measured by the control system 104 and the controller calibration system 200, measurements taken by the control system 104 may be referred to as an initial measured characteristic of the load and may include an initial voltage, an initial current, and/or an initial resistance. The initial measured characteristic is indicative of the electrical characteristic of the load. In addition, measurements taken by the controller calibration system 200 may be referred to as a calibrated measured characteristic of the load and may include a calibrated voltage, a calibrated current, and/or a calibrated resistance. The calibrated measured characteristic is indicative of the electrical characteristic of the load.

Since the control system 104 is configured to calculate resistance over a wide range of power levels, the calibration controller 212 calibrates the control system 104 at different power levels (i.e., power setpoints). For example, the calibration controller 212 is configured to apply at least one low power amount (e.g., 10V) and at least one high power amount (e.g., 130V) via the precision power source 204. In one form, the current is calibrated by keeping the voltage constant and varying the programmable load to different resistive loads (i.e., resistance setpoints) to provide at least one low current point, such as 5A, and at least one high current calibration point, such as 15A. In yet another form, the calibration controller 212 may have the control system 104 apply the full power amount (e.g., 100% of input voltage) or a reduced power amount (e.g., 90% or 75% of the input voltage) to the load 206 via the power converter system 108.

In one form, the calibration controller 212 correlates the measurements from the control system 104 with the measurements from the precision V-I sensors 208 and 210 to calibrate measurements by the control system 104. Specifically, the calibration controller 212 defines correlation data or, in other words, a calibrated measurement reference, that maps measurements from the control system 104 (i.e., initial measured characteristic(s)) with that of the precision V-I sensors 208 and 210 (i.e., calibrated measured characteristic(s)) to improve accuracy and control of the heater. The correlation data may also include the resistance calculated based on the measurements (i.e., the control system resistance and/or the calibrated resistance). In one form, the correlation data may be provided as statistical relationships (e.g., linear model), algorithms, or other suitable correlations that are stored by the heater controller 106. In another form, correlation data may be a table that associates the measurements from the precision V-I sensors 208 and 210 with the measurements taken by the sensor circuits 124. The table may also include the resistance(s) calculated by the calibration controller 212. Accordingly, in one form, the calibrated measurement reference is based on the correlation of the initial measured characteristic(s) from the control system 104 and the calibrated measured characteristic(s) from the controller calibration system 200. In lieu of the calibration controller 212 generating the correlation data, in another form, the control system 104 is configured to generate the correlation data. For example, the calibration controller 212 may provide data such as measurements from the precision V-I sensors 208 and 210 to the control system 104, and the heater controller 106 of the control system 104 generates the correlation data using these measurements and the measurements from the sensor circuits 124.

In lieu of a DC power source, the calibration system may include an AC power source. In such configuration, AC power is provided to a low temperature coefficient resistor that can operate at a high current (e.g., 20 amps) and is actively cooled. The control system 104 and the calibration controller 212 measure the known resistance over AC voltage ranges (e.g., 1-208V) and power modulation range (e.g., 0-100%) of the control system 104.

The control system 104 for a multi-zone heater 102 operates as a power delivery device and a high accuracy ohmmeter. Ohmmeters typically deliver as little power to the resistance being measured to not disturb the system but enough to get a good signal. Here, the control system 104 is delivering significant power and also senses the resistance of the resistive heating elements being driven to the same accuracy as a precision ohmmeter while delivering power in the form of high current and voltage. Calibration and sensing under these conditions is a significant challenge. The calibration system of the present disclosure: (1) provides a controllable electrical stimuli to a known load via the control system 104 at low voltage(s) and high voltage(s); (2) for each power setpoint, acquires electrical characteristics of the load from the control system 104 and measures the electrical characteristics of the load using a high precision ammeter and a voltmeter; and (4) correlates the measurements taken by the high precision meters with that of the control system 104 to calibrate the measurements of the control system 104. Accordingly, the current and voltage measurements, and thus, the resistance measured by the control system 104 is calibrated to achieve a high precision resistance measurement. (e.g., ±0.005 ohms or better).

(II) Calibration of Resistance-Temperature for Two-Wire Heater

With the two-wire heater, the control system 104 determines the temperature of a given zone 114 based on the resistance of the resistive heating element of the zone 114. To determine the temperature, the control system 104 includes resistance-temperature calibration data (i.e., resistance-temperature calibration reference) that associates multiple resistances with respective temperature measurements. As described herein, the control system 104 is configured to perform a heater calibration control to generate and store this calibration data, which is used during standard operations to measure the temperature of the zones and control power to the resistive heating elements. The heater calibration control of the present disclosure may be performed for a two-wire heater having one or more zones, and should not be limited to a multi-zone heater.

Figure 4:
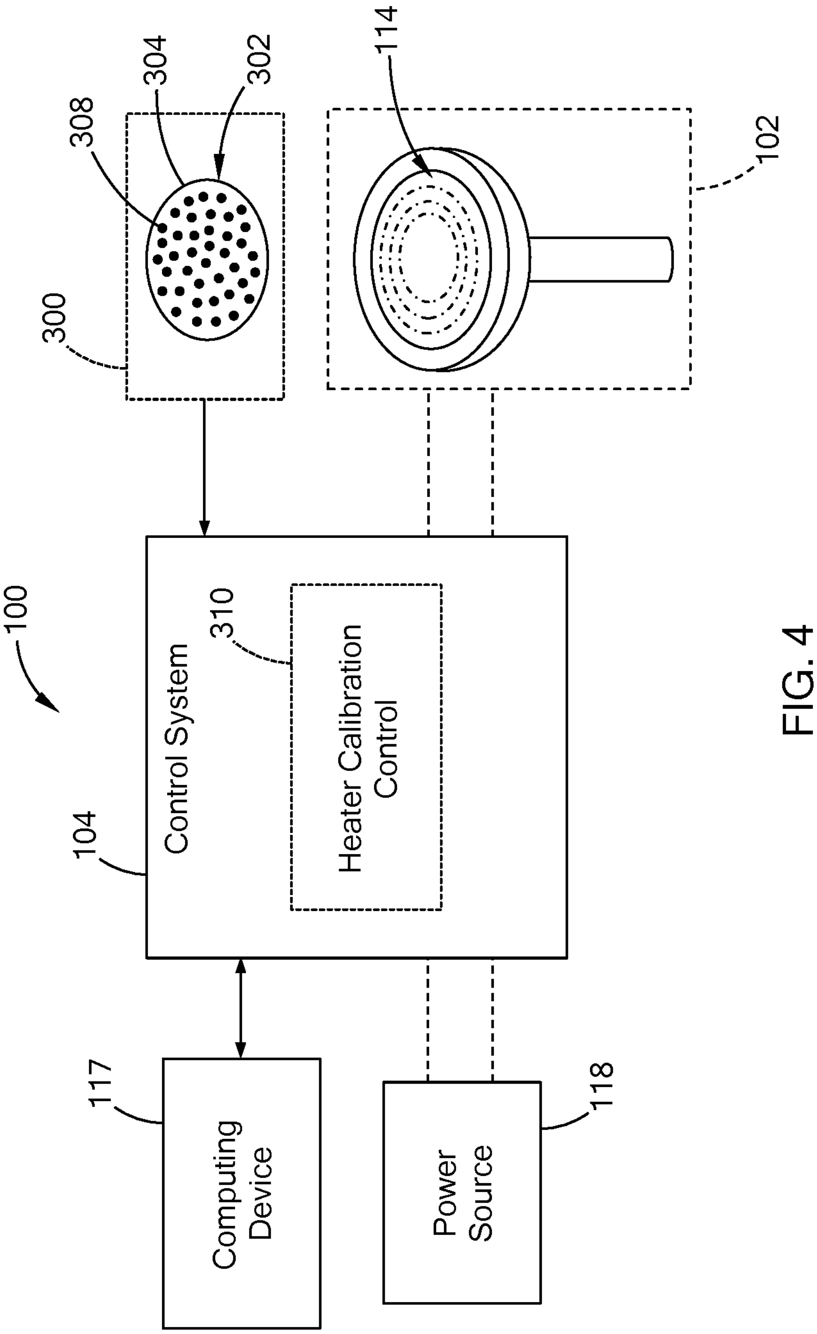
FIG. 4 is a block diagram of a calibration set-up according to the present disclosure for calibrating the multi-zone heater of FIG. 1.

Referring to FIG. 4, the thermal system 100 including the control system 104 and the heater 102 is calibrated with the use of a temperature sensor system 300 that measures the temperature of the zones 114 of the heater 102 and outputs the measurements to the control system 104.

In one form, the temperature sensor system 300 is a thermocouple (TC) wafer 302 that has a wafer 304 and a plurality of TCs 308 distributed along the wafer 304. During calibration, the TC wafer 302 is positioned on the multi-zone heater 102 and is secured to the surface using various methods, such as generating a negative pressure in a chamber housing the heater 102 and TC wafer 302, bonding the TC wafer 302 to the heater 102, or by gravity. The temperature sensor system 300 may be other suitable sensor(s) and should not be limited to a thermocouple wafer. For example, the temperature sensor system 300 may be provided as a TC jig that probes the surface of the heater 102 with an array of TC spring-loaded sensors. In another example, the temperature sensor system 300 is an infrared camera that capture thermal images of the surface of the heater 102.

Figure 5:
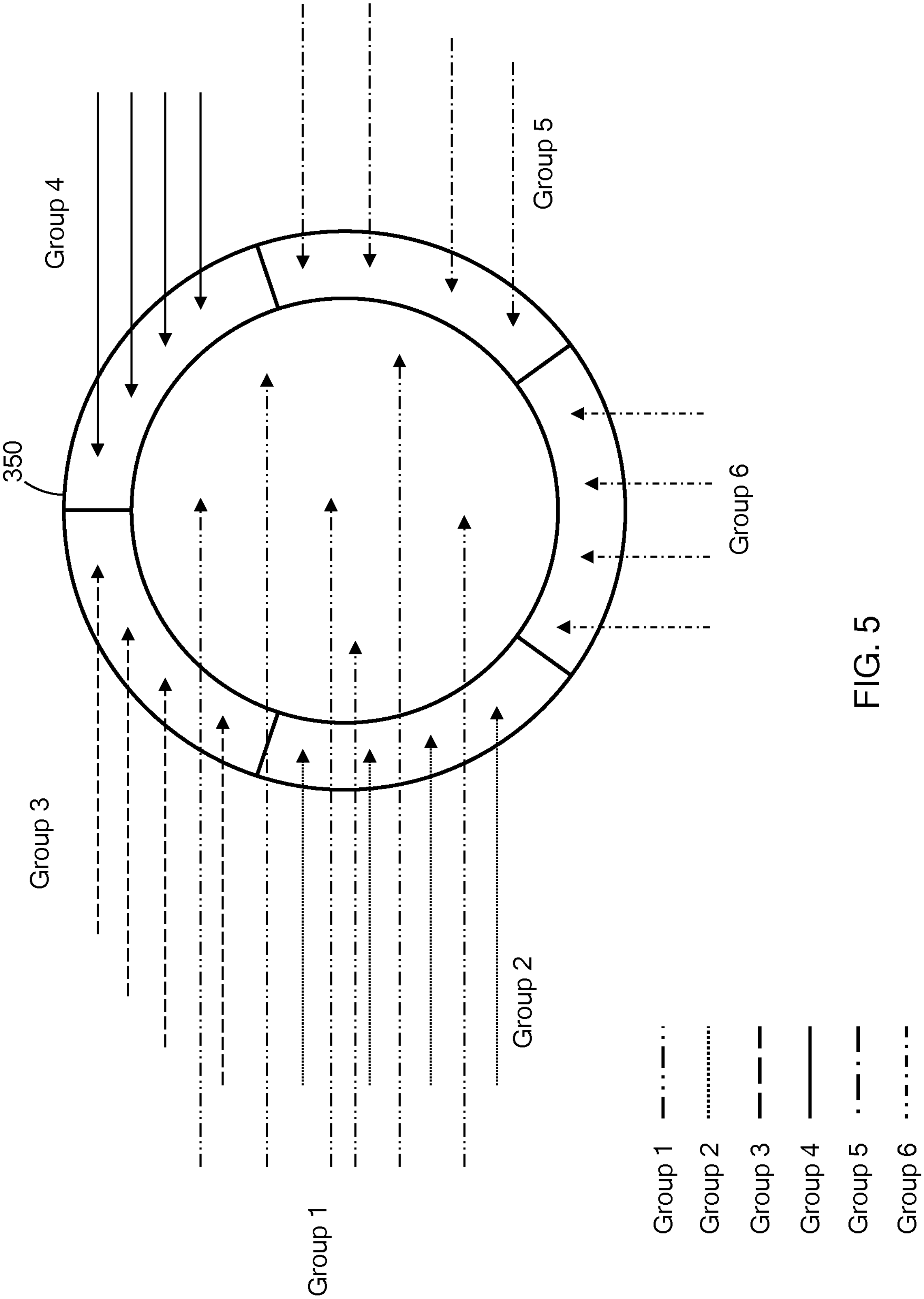
FIG. 5 illustrates the grouping of multiple thermocouples for a thermocouple wafer in accordance with the present disclosure.

In one form, the TCs of a TC wafer are configured in multiple groups that correspond to zones 114 of thermal control of the heater 102. For example, in FIG. 5, a TC wafer 350 includes 26 TCs (represented by the arrows) distributed about the TC wafer 350. The TCs are arranged into six groups in which Group 1 has 6 TCs, and Groups 2, 3, 4, 5, and 6 each have 4 TCs. Group 1 correlates with a zone provided at center area of the heater 102 and groups 2-6 correlate with one or more zones provided along an outer ring of the heater 102. The TCs of a TC wafer can be grouped in various suitable ways to correlate with the zones of the heater 102 and should not be limited to the configuration illustrated in FIG. 5.

Figure 6:
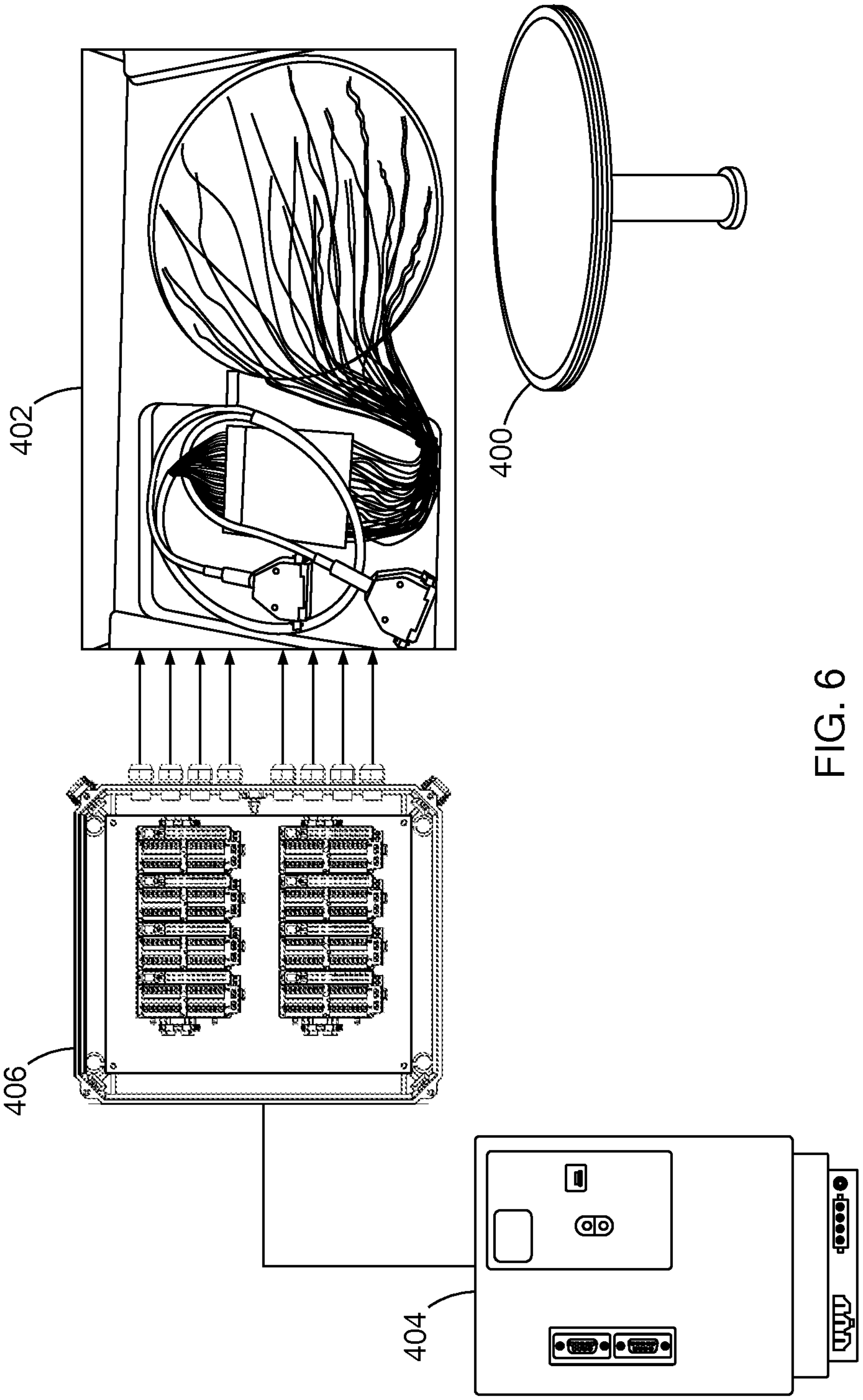
FIG. 6 illustrates a calibration set-up for calibrating a control system and a multi-zone heater in accordance with the present disclosure.

The control system 104 includes input/output interface (not shown) for connecting to the TC wafer 302. For example, FIG. 6 illustrates an example configuration in which a pedestal heater 400 is to receive a TC wafer 402. The TC wafer includes a plurality of TC sensors with a plurality of wires extending from the TC sensors. In one form, the TC sensors are connected to a control system 404 by way of a TC scanner system 406 that is used to monitor measurements from the TC sensors. The TC sensors may be connected to the control system 404 in other suitable ways and should not be limited to the TC scanner system 406. Through the wired connection, the heater controller of the control system 404 receives temperature measurements, such as average temperature of a zone, discrete temperature measurements from each TC, standard deviation, among others, from the TCs of the TC wafer 402. The heater 400 and the control system 404 are similar to the heater 102 and the control system 104, respectively.

Referring to FIG. 4, the control system 104 is configured to include a heater calibration control 310 that is provided in the heater controller 106 for generating the resistance-temperature calibration data for the various zones and the heater 102 as a whole. In one form, based on the wired connection between the TC wafer 302 and the control system 104, the heater calibration control 310 maps the TC sensors 308 to their respective temperature measurements, and maps the temperature measurements to their physical location on the TC wafer 302. Accordingly, the temperature measurements are further associated to the defined groups that corresponds to the zones of thermal control on the heater 102, and thus, identifying the group of sensors for a given zone of the heater 102.

In one form, the heater calibration control 310 heats the heater to multiple temperature setpoints, such that the heater 102 has a uniform thermal profile. For each temperature setpoint, the heater calibration control 310 receives the temperature measurements from the TC sensors 308 and receives electrical characteristics (e.g., voltage and/or current) measurements from the sensor circuits 124. Based on the temperature measurements (i.e., temperature dataset), the heater calibration control 310 generates temperature metrology data for each group for a given setpoint, which may include at least one of: a mean temperature, which corresponds to the average temperature of respective heater zone associated with the group; a median temperature; a variance of temperature, which corresponds to variance of respective heater zone; a standard deviation of temperature, which corresponds to the standard deviation for respective heater zone; a maximum temperature; a minimum temperature; a temperature range; a 3-sigma value; and indices of the minimum, maximum, and median sensors in the group. While specific metrology data are listed, the heater calibration control 310 may calculate other metrology data based on the temperature measurements.

In addition to determining the metrology data for each group, the heater calibration control 310, calculates the metrology data for the entire TC wafer 302, and thus, the heater 102 as a whole. For example, the mean temperature, the median temperature, the maximum temperature, the minimum temperature, and other metrology data are calculated based on all of the temperature measurements. These measures are used for monitoring and controlling the heater 102 to provide uniform thermal distribution over the surface of the heater 102, and not just a single zone.

In one form, the heater calibration control 310 associates the mean (average) temperature of a given group as the average temperature for a respective zone. Based on the voltage and/or current measured for a zone at the time of the temperature measurements, the heater calibration control 310 determines the resistance of the resistive heating element of the zone and correlates the resistance of the zone to the average temperature of the respective group. In one form, the heater calibration control 310 employs the calibrated measurement reference when determining the electrical characteristics (i.e., voltage, current, and/or resistance). The resistance of the resistive heating element is saved for each zone at each setpoint as part of the resistance-temperature calibration data. By having the resistance-temperature calibration data, the control system 104 may accurately control the zones via its sensed temperature using the resistance as a direct proxy for the true temperature. In lieu of or in addition to the average temperature, other metrology sources may alternatively be used as control sources, such as the range, median, minimum, and maximum.

The heater calibration control 310 may further perform diagnostics on the temperature sensor system 300 to identify possible faulty sensors using one or more of the metrology data. That is, sensors may fail due to various reasons, such as normal wear, excessive use, and environmental conditions, and an abnormal reading from a sensor skews the temperature calibration causing poor uniformity. In one form, to detect faulty sensors in a given group, the heater calibration control 310 compares the temperature measurements from the sensors to the median temperature for the given group. If a temperature reading deviates from the median by a predefined amount (i.e., ±10° C.), the heater calibration control 310 identifies the sensor outputting the erroneous temperature reading as being faulty. The temperature variation tolerance may be predefined and determined based on experimental testing of model heaters and control systems. The heater calibration control 310 identifies the faulty sensors and excludes the faulty sensors from calculating one or more of the metrology data, such as the average temperature.

As part of the diagnostics, the heater calibration control 310 defines the maximum number of faulty sensors permissible for each zone before the temperature sensor system 300 is considered defective. For example, for a group having 4 TC sensors, the group is permitted one faulty sensor before being considered defective and for a group having 5 TC sensors, the group is permitted two faulty sensors. Accordingly, if any group of sensors has surpassed the number of permissible fault sensors, the heater calibration control 310 stops the calibration process (e.g., turns off power to the heater 102) and notifies the user of the faulty temperature sensor system 300. The number of permissible faulty sensors is predefined and can be based on the number of sensors in the group and the accuracy level provided for the heater 102.

Using the temperature measurements from the TC sensors and the voltage and current measurements from the sensor circuits, the heater controller is configured to self-calibrate using an algorithm such as direct control temperature via the sensor array. That is, in one form, the heater is controlled to an average temperature determined by the heater controller based on measurements from the TC sensors. The heater can also be controlled to a nominal temperature as measured by the resistive heating elements of the heater based on data from previous heaters that are of the same class as the heater being tested. Such data may be close but not exact for each unique pedestal produced.

In operation, the heater calibration control performed by the control system may begin when the temperature sensor system is set-up (e.g., positioned and secured to the heater and communicably coupled to the controller). In one form, the heater calibration control controls the heater at multiple setpoints, such as temperature setpoints. For each setpoint, the heater is maintained at the setpoint until heater and/or the TC wafer is at equilibrium, and the control system measures and records the resistance at each of the zones based on data from the sensor circuits, and acquires temperature measurements from the temperature sensor system. The control system then calculates metrology data, such as average temperature, for each zone and for the heater as a whole. The defined setpoints, the measured resistance, and/or one or more of the metrology data can be stored as resistance-temperature calibration data, and provided in various suitable ways, such as a table. During the calibration, the control system may perform the sensor diagnostics as described herein to verify that the temperature sensor system is operating within set parameters.

In one form, the control system may display one or more graphical user interfaces for displaying information to the user and receiving commands from the user. For example, in one form, the control system may display a curve of the calibration data, a heat pattern of the heater, and/or the metrology data for each zone and for the overall heater. This information can allow optimization of the zones to match desired temperature profiles and allows the heater and control system to work together for optimum uniformity.

Using the resistance-temperature calibration data, the control system measures the temperature of each zone of the multi-zone heater without the use of a discrete temperature sensor at the zones, and with accurate precision to provide closed loop/servo control of all zones. As described herein, the calibration process is automated, so operational personnel do not need detailed understanding of the calibration other than how to install the temperature sensor system and start the calibration stored in the control system. In one form, a thermal system may implement one of the calibration processes of the present disclosure or both.

Figure 7:
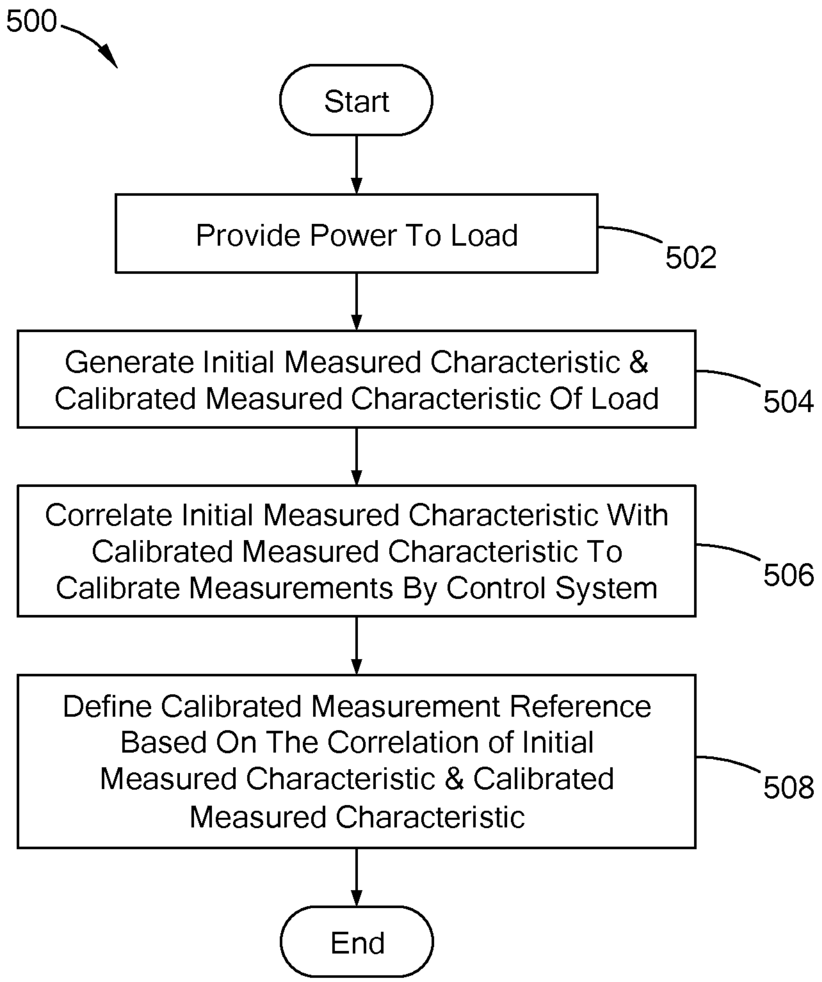
FIG. 7 is a flowchart of an exemplary control system calibration routine.

Referring to FIG. 7, an example control system calibration routine 500 is provided. The control system calibration routine is performed by the controller calibration system of the present disclosure. At 502, the system provides power to the load via the control system and at 504, the system generates the initial measured characteristic of the load from the control system and the calibrated measured characteristic of the load from the controller calibration. In one form, once generated, power to the load may be turned off. The initial measured characteristic and the calibrated measured characteristic are indicative of an electrical characteristic of the load that includes a voltage, a current, and/or a resistance. More particularly, in one form, to generate the initial measured characteristic, an initial voltage and an initial current of the load is measured by the control system, and to generate the calibrated measured characteristic, a calibrated voltage and a calibrated current of the load is measured by the controller calibration system. In one form, the initial voltage and the calibrated voltage are concurrently measured, and the initial current and the calibrated current are concurrently measured. In another form, initial voltage, initial current, the calibrated voltage, and the calibrated current are concurrently measured. In one form, the initial resistance of the load is calculated based on the initial voltage and initial current and is also provided as the initial measured characteristic, and a calibrated resistance of the load is calculated based on the calibrated voltage and the calibrated current of the load and is also provided as the calibrated measured characteristic.

At 506, the system, correlates the initial measured characteristic with the calibrated measured characteristic to calibrate measurements by control system. At 508, the system defines a calibrated measurement reference based on the correlation of the initial measured characteristic and the calibrated measured characteristic.

The routine 500 is just one example routine for performing the heater control calibration and may be configured in various suitable way. For example, in one form, the calibrated measurement references may be defined for multiple power setpoints and/or multiple known resistances of the load (i.e., load resistance). For each power and/or load resistance, the initial measured characteristic and the calibrated measured characteristic is generated and then correlated to define the calibrated measurement reference.

Figure 8:
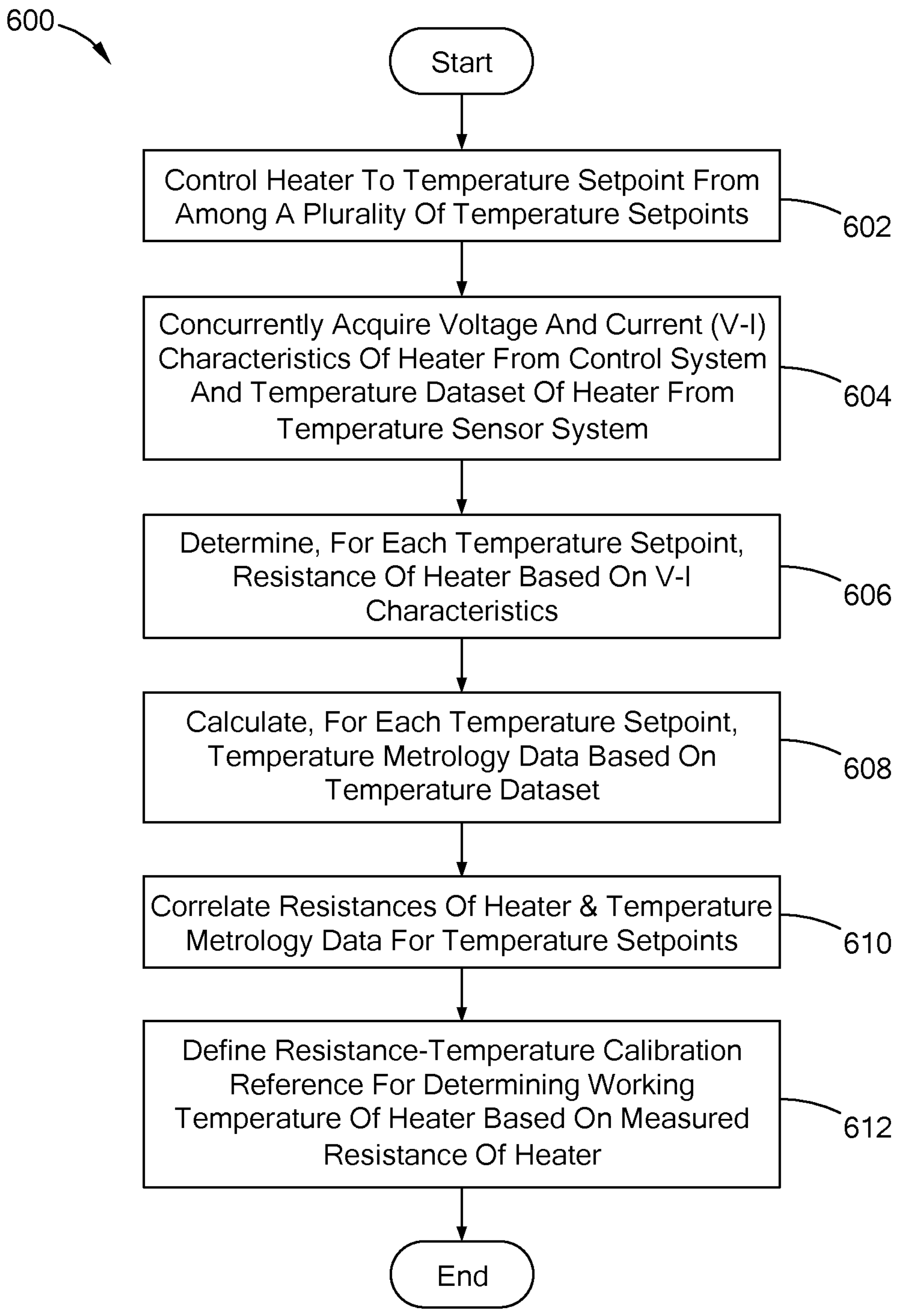
FIG. 8 is a flowchart of an exemplary heater calibration control routine.

Referring to FIG. 8, an example heater calibration control routine 600 performed by the control system is provided. The routine 600 may be executed when a temperature sensor system is connected to the control system to provide temperature measurements of the heater. At 602, the heater is controlled to a temperature setpoint from among a plurality of temperature setpoints. At 604, the voltage and current (V-I) characteristics and a temperature dataset of the heater is acquired. The V-I characteristics and the temperature dataset is acquired for each temperature setpoint. At 606, the control system determines, for each temperature setpoint, the resistance of the heater based on V-I characteristics acquired for the temperature setpoint. At 608, the control system determines temperature metrology data based on the temperature dataset acquired for the temperature setpoint. In one form, the temperature metrology data includes a mean temperature, a median temperature, a temperature variance, a standard deviation, a maximum temperature, a minimum temperature, a temperature range, and/or a 3-sigma value. At 610, the control system correlates the resistances of the heater and the temperature metrology data for the temperature setpoints. At 612, the control system defines a resistance-temperature calibration reference for determining a working temperature of the heater based on a measured resistance of the heater.

If the heater a multi-zone heater, power is provided and controlled to each of the zones such that the temperatures of the zones is substantially equal to the temperature setpoint. In addition, the V-I characteristics and temperature measurements is captured for each of the zones. The temperature dataset of the heater from the temperature sensor system includes at least one temperature measurement for each of the zones.

The routine 600 is just one example routine for performing theater control calibration and may be configured in various suitable way. For example, in one form, the routine may perform a diagnostic on the temperature sensor system to identify possible faulty sensors. More particularly, in one form, each zone for a multi-zone heater is associated with two or more temperature sensors (i.e., a sensing group) from among the temperature sensors of the temperature sensor system. For each sensing group a sensor diagnostic is performed to identify a faulty temperature sensor from among temperatures sensors of the sensing group based on the temperature measurements from the sensing group. When the sensor diagnostic identifies the faulty temperature sensor and the number of identified faulty temperature sensor is less than a faulty sensor threshold, the temperature measurement from the faulty temperature sensor is discarded prior to determining temperature metrology data. When the number of identified faulty temperature sensor is greater than the faulty sensor threshold, power to the heater is turned-off. Furthermore, unless otherwise indicated, all numerical values representing tolerances, temperatures, voltages, currents, or other characteristics are provided as examples. Accordingly, it should be readily understood that other numerical values may be used while remaining within the scope the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" may be replaced with the term "circuit". The term "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term code may include software, firmware, and/or microcode, and may refer to programs, routines, functions, classes, data structures, and/or objects. The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for calibrating a control system configured to operate a two-wire heater, the two-wire heater being operable to generate heat and to function as a sensor for measuring temperature of the two-wire heater, the method comprising:

controlling, by the control system, the two-wire heater to a temperature setpoint from among a plurality of temperature setpoints;

concurrently acquiring voltage and current (V-I) characteristics of the two-wire heater from the control system and temperature dataset of the two-wire heater from a temperature sensor system, wherein the V-I characteristics and the temperature dataset are acquired for each of the plurality of temperature setpoints;

determining, for each of the plurality of temperature setpoints, a resistance of the two-wire heater based on the V-I characteristics acquired;

calculating, for each of the plurality of temperature setpoints, a temperature metrology data based on the temperature dataset acquired;

correlating the resistances of the two-wire heater and the temperature metrology data for the plurality of temperature setpoints; and defining a resistance-temperature calibration reference for determining a working temperature of the two-wire heater based on a measured resistance of the two-wire heater.

2. The method of claim 1, wherein the concurrently acquiring the V-I characteristics of the two-wire heater and the temperature dataset further comprises:

measuring, by a sensor circuit of the control system, the V-I characteristics of the two-wire heater; and measuring, by the temperature sensor system, a plurality of temperature measurements of the two-wire heater at the temperature setpoint, wherein the plurality of temperature measurements is provided as the temperature dataset for the temperature setpoint.

3. The method of claim 1, wherein the temperature metrology data includes a mean temperature, a median temperature, a temperature variance, a standard deviation, a maximum temperature, a minimum temperature, a temperature range, a 3-sigma value, or a combination thereof.

4. The method of claim 1, wherein the two-wire heater includes a plurality of resistive heating elements that define a plurality of zones, the control system is configured to control each zone independently, the V-I characteristics of the two-wire heater acquired from the control system includes V-I characteristics for each of the plurality of zones, wherein the V-I characteristics for a zone among the plurality of zones is provided as a zone characteristic, and the temperature dataset of the two-wire heater acquired from the temperature sensor system includes at least one temperature measurement for each of the plurality of zones.

5. The method of claim 4, wherein controlling, by the control system, the two-wire heater to the temperature setpoint further comprises:

providing power to the plurality of zones of the two-wire heater;

obtaining a temperature for each of the plurality of zones of the two-wire heater; and adjusting power to the plurality of zones in response to the temperature of one or more zones from among the plurality of zones not equaling the temperature setpoint.

6. The method of claim 4, wherein the temperature sensor system includes a plurality of temperature sensors, wherein the method further comprises associating, for each zone of the plurality of zones, one or more temperature sensors among the plurality of temperature sensors with a respective zone, wherein the one or more temperature sensors are configured to provide temperature measurements of the temperature for the respective zone.

7. The method of claim 6, wherein each of the plurality of zones is associated with two or more temperature sensors from among the plurality of temperature sensors, the two or more temperature sensors are provided as a sensing group, and the method further comprises:

performing, for each sensing group, a sensor diagnostic to identify a faulty temperature sensor from among temperatures sensors of the sensing group based on the temperature measurements from the sensing group;

discarding the temperature measurement from the faulty temperature sensor in response to the sensor diagnostic identifying the faulty temperature sensor and when a number of identified faulty temperature sensor is less than a faulty sensor threshold; and shutting off power to the two-wire heater in response to the sensor diagnostic identifying the faulty temperature sensor and when the number of identified faulty temperature sensor is greater than the faulty sensor threshold.

8. The method of claim 6, wherein each of the plurality of zones is associated with two or more temperature sensors from among the plurality of temperature sensors, the two or more temperature sensors are provided as a sensing group and the method further comprises:

calculating, for each sensing group, a zone temperature metrology data based on the temperature measurements from the two or more temperature sensors of respective sensing group.

9. The method of claim 8, wherein the zone temperature metrology data includes a mean temperature, a median temperature, a temperature variance, a standard deviation, a maximum temperature, a minimum temperature, a temperature range, a 3-sigma value, or a combination thereof.

10. A method for calibrating a control system configured to operate a two-wire heater, the two-wire heater being operable to generate heat and to function as a sensor for measuring temperature of the two-wire heater, the method comprising:

controlling, by the control system, the two-wire heater to a temperature setpoint from among a plurality of temperature setpoints;

concurrently acquiring voltage and current (V-I) characteristics of the two-wire heater from the control system and temperature dataset of the two-wire heater from a temperature sensor system, wherein the V-I characteristics and the temperature dataset are acquired for each of the plurality of temperature setpoints, the temperature sensor system includes a plurality of temperature sensors;

performing a sensor diagnostic to identify a faulty temperature sensor from among the plurality of temperature sensors based on temperature measurements;

discarding the temperature measurement from the faulty temperature sensor in response to the sensor diagnostic identifying the faulty temperature sensor and a number of identified faulty temperature sensor is less than a faulty sensor threshold; and shutting off power to the two-wire heater in response to the sensor diagnostic identifying the faulty temperature sensor and the number of identified faulty temperature sensor is greater than the faulty sensor threshold.

11. The method of claim 10, wherein in response to the sensor diagnostic not identifying the faulty temperature sensor or the number of identified faulty temperature sensor is less than the faulty sensor threshold, the method further comprises:

determining, for each of the plurality of temperature setpoints, a resistance of the two-wire heater based on the V-I characteristics acquired;

calculating, for each of the plurality of temperature setpoints, a temperature metrology data based on the temperature dataset;

correlating the resistances of the two-wire heater and the temperature metrology data for the plurality of temperature setpoints; and defining a resistance-temperature calibration reference for determining a working temperature of the two-wire heater based on a measured resistance of the two-wire heater.

12. The method of claim 10, wherein the concurrently acquiring the V-I characteristics of the two-wire heater and the temperature dataset further comprises:

measuring, by a sensor circuit of the control system, the V-I characteristics of the two-wire heater; and measuring, by the temperature sensor system, a plurality of temperature measurements of the two-wire heater at the temperature setpoint, wherein the plurality of temperature measurements is provided as the temperature dataset for the temperature setpoint.

13. The method of claim 11, wherein the temperature metrology data includes a mean temperature, a median temperature, a temperature variance, a standard deviation, a maximum temperature, a minimum temperature, a temperature range, a 3-sigma value, or a combination thereof.

14. The method of claim 10, wherein the two-wire heater includes a plurality of resistive heating elements that define a plurality of zones, the control system is configured to control each zone independently, the V-I characteristics of the two-wire heater acquired from the control system includes V-I characteristics for each of the plurality of zones, wherein the V-I characteristics for a zone among the plurality of zones is provided as a zone characteristic, and the temperature dataset of the two-wire heater acquired from the temperature sensor system includes at least one temperature measurement for each of the plurality of zones.

15. The method of claim 14, wherein controlling, by the control system, the two-wire heater to the temperature setpoint further comprises:

providing power to the plurality of zones of the two-wire heater;

obtaining a temperature for each of the plurality of zones of the two-wire heater; and adjusting power to the plurality of zones in response to the temperature of one or more zones from among the plurality of zones not equaling the temperature setpoint.

16. The method of claim 14, wherein the temperature sensor system includes a plurality of temperature sensors, wherein the method further comprises associating, for each zone of the plurality of zones, one or more temperature sensors among the plurality of temperature sensors with a respective zone, wherein the one or more temperature sensors are configured to provide the temperature measurements for the respective zone.

17. The method of claim 16, wherein each of the plurality of zones is associated with two or more temperature sensors from among the plurality of temperature sensors, the two or more temperature sensors are provided as a sensing group and the method further comprises:

calculating, for each sensing group, a zone temperature metrology data based on the temperature measurements from the two or more temperature sensors of respective sensing group.

18. The method of claim 17, wherein the zone temperature metrology data includes a mean temperature, a median temperature, a temperature variance, a standard deviation, a maximum temperature, a minimum temperature, a temperature range, a 3-sigma value, or a combination thereof.

19. A method for calibrating a control system configured to operate a two-wire heater, the two-wire heater being operable to generate heat and to function as a sensor for measuring temperature of the two-wire heater, the method comprising:

controlling, by the control system, the two-wire heater to a plurality of temperature setpoints;

concurrently acquiring voltage and current (V-I) characteristics of the two-wire heater from the control system and temperature dataset of the two-wire heater from a temperature sensor system, wherein the V-I characteristics and the temperature dataset are acquired for each of the plurality of temperature setpoints;

determining, for each of the plurality of temperature setpoints, a resistance of the two-wire heater based on the V-I characteristics acquired; and defining a resistance-temperature calibration reference for determining a working temperature of the two-wire heater based on a measured resistance of the two-wire heater.

20. The method of claim 19, further comprising:

calculating, for each of the plurality of temperature setpoints, a temperature metrology data based on the temperature dataset acquired; and correlating the resistances of the two-wire heater and the temperature metrology data for the plurality of temperature setpoints, wherein the concurrently acquiring the V-I characteristics of the two-wire heater and the temperature dataset further comprises:

measuring, by a sensor circuit of the control system, the V-I characteristics of the two-wire heater; and measuring, by the temperature sensor system, a plurality of temperature measurements of the two-wire heater at a temperature setpoint from among the plurality of temperature setpoints, wherein the plurality of temperature measurements is provided as the temperature dataset for the temperature setpoint.

* * * * *